(12) United States Patent
Da Silva et al.

(10) Patent No.: US 11,556,214 B2
(45) Date of Patent: Jan. 17, 2023

(54) CONTROL ELEMENT AND SYSTEM FOR CONTROLLING A FUNCTION ON A CAPACITIVE SURFACE

(71) Applicant: Faurecia Innenraum Systeme GmbH, Hagenbach (DE)

(72) Inventors: Edouard Da Silva, Herblay (FR); Ruddy Cittadini, Minfeld (DE); Martin Schulz, Karlsruhe (DE); Nils Hollemann, Jockgrim (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 17/395,990

(22) Filed: Aug. 6, 2021

(65) Prior Publication Data

US 2022/0043533 A1 Feb. 10, 2022

(30) Foreign Application Priority Data

Aug. 7, 2020 (DE) .................... 10 2020 210 052.7

(51) Int. Cl.
| | | |
|---|---|---|
| *G06F 3/041* | (2006.01) | |
| *G06F 3/044* | (2006.01) | |
| *G06F 3/0362* | (2013.01) | |
| *H01H 19/08* | (2006.01) | |
| *B60K 37/06* | (2006.01) | |
| *H01H 19/14* | (2006.01) | |

(52) U.S. Cl.
CPC .......... *G06F 3/0442* (2019.05); *G06F 3/0362* (2013.01); *H01H 19/08* (2013.01); *B60K 37/06* (2013.01); *H01H 19/14* (2013.01)

(58) Field of Classification Search
CPC ...... G06F 3/0442; G06F 3/0362; G06F 3/041; H01H 19/08; H01H 19/14; B60K 37/06; B60K 2370/126; B60K 2370/128; B60K 2370/145; B60K 2370/1434
See application file for complete search history.

(56) References Cited

U.S. PATENT DOCUMENTS

| | | | |
|---|---|---|---|
| 9,925,456 B1 * | 3/2018 | Hershey | A63F 13/98 |
| 2002/0148715 A1 * | 10/2002 | Oster | B60K 37/06 |
| | | | 200/564 |

(Continued)

*Primary Examiner* — Lunyi Lao
*Assistant Examiner* — Jarurat Suteerawongsa
(74) *Attorney, Agent, or Firm* — Schwegman Lundberg & Woessner, P.A.

(57) ABSTRACT

Disclosed herein is a control element, which can be arranged on a capacitive surface, for controlling a function of the capacitive surface, comprising a carrier structure, a rotary element rotatable about an axis of rotation with respect to the carrier structure, comprising at least one electrically conductive area, at least one electrically conductive contact element arranged on the carrier structure, wherein the contact element comprises a contact area which is arranged at least in some areas on an underside of the control element, so that the contact area, when the control element is arranged on the capacitive surface, is arranged at least partially touching the capacitive surface, wherein the electrically conductive area of the rotary element is in contact with a contact element in at least one rotational position of the rotary element. The rotary element can be moved along the axis of rotation with respect to the carrier structure.

18 Claims, 3 Drawing Sheets

(56) References Cited

U.S. PATENT DOCUMENTS

| | | | |
|---|---|---|---|
| 2006/0256090 A1* | 11/2006 | Huppi | G06F 1/1616 |
| | | | 345/173 |
| 2019/0080864 A1* | 3/2019 | Sawada | H01H 15/06 |
| 2019/0391672 A1* | 12/2019 | Fischer | G06F 3/0362 |
| 2020/0081554 A1* | 3/2020 | Eraslan | G06F 3/0338 |
| 2020/0081557 A1* | 3/2020 | Togashi | G06F 3/0362 |

* cited by examiner

CONTROL ELEMENT AND SYSTEM FOR CONTROLLING A FUNCTION ON A CAPACITIVE SURFACE

CLAIM FOR PRIORITY

This application claims the benefit of priority of German Application No. 10 2020 210 052.7, filed 7 Aug. 2020, which is hereby incorporated by reference in its entirety.

TECHNICAL FIELD

The present application relates to a control element and a system comprising a corresponding control element for controlling a function, particularly a function of a motor vehicle element, on a capacitive surface, particularly a touch screen.

BACKGROUND

Control elements for controlling functions in motor vehicles, particularly for controlling electrical vehicle components, for example, an air conditioning system, are generally known. Said control elements usually comprise mechanical rotary controls that, via sensors, determine the angular position of the rotary control and thus the user command. A processing unit causes a change in the prevailing setting of a vehicle component in accordance with the user command, for example, an adjustment of the temperature in the vehicle.

Touch screens have the advantage that areas of the touch screen can be assigned functions through programming. The same parts can thus be installed in different models or designs; however, different functions or representations of the functions can be implemented on the screen.

However, touch screens have the disadvantage that they usually have a smooth, even surface, so that a user can only see the stored functions but not perceive them haptically. Particularly with touch screens in a vehicle interior, it is therefore advantageous to arrange control elements on the touch screen that the user can perceive haptically so that he can continue to focus on the traffic situation while controlling vehicle functions.

For this purpose, haptically perceptible rotary controls arranged on a touch screen which comprise an element that slides on the touch screen are known in the prior art. The angular position of the element of the rotary control is detected by the touch screen. The rotary controls protrude from the smooth touch screen surface and are haptically perceptible.

However, such a design has the disadvantage that the sliding contact between the element and the touch screen wears and damages the touch screen and/or the element. This has both consequences that are aesthetically undesirable, for example, undesired scratches or furrows in the touch screen surface. In addition, wear and tear can lead to the electrical charges no longer being reliably transferred through the electrically conductive element to the touch screen and/or no longer being recognized correctly and reliably by the touch screen. A further disadvantage can be unwanted noises caused by friction. A further disadvantage could be that undesired, different settings can be activated briefly when the element is in contact with a corresponding area of the touch screen while the rotary control is being rotated.

SUMMARY/OVERVIEW

The present application is therefore based on the object of at least partially overcoming this problem. This object is achieved by the subject matter of claim 1 and claim 10. Advantageous developments are presented in the dependent claims and in the description.

The control element according to the invention is suitable for controlling a function on a capacitive surface, particularly a touch screen, and is arrangeable on said capacitive surface for this purpose.

The control element comprises a carrier structure. The carrier structure can be fastened immovably on the capacitive surface, for example, a touch screen.

The control element further comprises a rotary element. The rotary element can be arranged on the carrier structure. The rotary element is rotatable about an axis of rotation with respect to the carrier structure or at least part of the carrier structure; particularly, the rotary element can be rotatably mounted on the carrier structure. The axis of rotation preferably corresponds to the longitudinal axis of the rotary element.

The rotary element comprises at least one electrically conductive area. The rotary element preferably comprises an electrically conductive material on the outer surface thereof which is touched by a user during the use of the control element. The rotary element can consist entirely of an electrically conductive material or only partially consist of an electrically conductive material. The rotary element can, for example, be formed in a circular shape, particularly a ring-shaped and/or cylindrical shape, particularly in the form of a hollow cylinder, truncated cone or hollow truncated cone. The axis of rotation of the rotary element typically runs through the center of the circular base area. The rotary element also preferably comprises an electrically conductive material on the inner surface thereof, at partially.

At least one electrically conductive contact element is arranged on the carrier structure. The contact element typically comprises a contact area. The contact area is arranged at least partially on an underside of the control element. The contact area can rest against an underside of the carrier structure or protrude beyond said carrier structure. The contact area is typically designed and arranged such that, when the control element is arranged on a capacitive surface, said control element is arranged at least partially touching the capacitive surface. Arranged in a touching manner means particularly that there are no air gaps between the contact area and the capacitive surface. The contact area can be arranged directly in contact with the capacitive surface or indirectly, for example, via an electrically conductive adhesive. The electrically conductive element can be designed, for example, as a pointer pen, in the form of a strip or a foil that rests against the carrier structure. The contact area can, for example, represent the lower end of the strip, which can protrude beyond the underside of the carrier structure. The contact element can be partially embedded in the carrier structure in formations corresponding to the shape of the contact element. The contact element can be arranged in the longitudinal direction parallel to the axis of rotation. The contact area preferably extends, at least partially, approximately at right angles to the longitudinal axis.

The control element preferably comprises a contact element assembly comprising a plurality of contact elements which are arranged at a distance from one another. A plurality of contact elements can enable a selection of several functions on the capacitive surface, particularly functions that differ from one another. The contact elements are preferably electrically insulated from one another, particularly by the carrier structure. A distance between the contact elements can preferably prevent a capacitive coupling between the contact elements.

An inside of the contact element, or the contact element assembly, is preferably designed arched, preferably such that it rests, at least partially, flat against the carrier structure, particularly against an outer surface of the carrier structure. The contact element or the contact element assembly is preferably glued to the carrier structure. The carrier structure can also be connected to the contact element or the contact element assembly by back injection molding.

A contact element can comprise an electrically conductive material, particularly copper, aluminum, steel and/or electrically conductive rubber. A contact element can comprise an electrically conductive ink and/or an electrically conductive foil and/or an electrically conductive film.

An electrically conductive area of the rotary element can be in contact with a contact element in a predetermined angular position of the rotary element. The contact element then typically connects a sub-area of the capacitive surface to the electrically conductive area of the rotary element. A function corresponding to this sub-area of the capacitive surface can thus be selected by a user.

The rotary element typically has an outer diameter between 10 mm and 100 mm. The outer diameter is preferably between 20 mm and 80 mm. For example, the outer diameter is 50 mm. With an outer diameter of 50 mm, the inner diameter can be 30 mm, for example. The rotary element typically has a height between 5 mm and 20 mm. For example, the height is 10 mm.

Particularly, a plurality of contact elements, preferably at least 10 contact elements, particularly preferably at least 24 contact elements, is arranged at a distance from one another on the carrier structure. The more contact elements are provided, the more functions can be selected or the more precisely a function can be set. The contact elements are typically arranged in a rotationally symmetrical manner around the axis of rotation. The contact elements can particularly be arranged at a distance of at least 1°, preferably at least 5°, and at a distance of at most 40°, preferably at most 15°. The electrically conductive area of the rotary element can be in contact with one of the contact elements by rotating the rotary element in a rotational position, that is, in an angular position. A set angular range of the rotary element can thus activate a position on the capacitive surface. The activated position can correspond to the position of the contact area of the activated contact element. The activated area on the capacitive surface can be assigned a function, for example, a temperature setting of an air conditioning system. The setting of a rotational position of the rotary element can thus activate a function on a capacitive surface.

The rotary element is movable along the axis of rotation with respect to the carrier structure. For example, the rotary element can be displaced in the axial direction between two positions. The rotary element can particularly be movable or displaceable such that the rotary element, in a first axial position, is arranged at a distance from the capacitive surface and in a second position, at least partially touches the capacitive surface on which it is arranged.

Touching the rotary element and displacing the rotary element from the first to the second position can result in two positions being activated on the capacitive surface at the same time, wherein one position is activated by the contact area selected by means of the rotational position of the rotary element and one position is activated by the contact between the capacitive surface and the rotary element. A confirmation function can be implemented in this way, for example. The user can select a function from a plurality of offered functions by rotating the rotary element, wherein each function can correspond to a contact element. The user can confirm a selection by displacing the rotary element from the first to the second position, for example, by pressing the rotary element in the direction of the capacitive surface. The function can be programmed such that a setting is only implemented when the setting of the rotary element is confirmed. Accidental adjustment of settings by accidentally turning the rotary element can thus be avoided or the risk can at least be reduced.

It can be provided that a rotation of the rotary element is only possible in the first axial position and a rotation of the rotary element is blocked in the second axial position. Friction between the rotary element and the capacitive surface can thus be reduced. Furthermore, accidental adjustment of the selected position during the user confirmation can be avoided.

The blocking can be achieved, for example, via a positive locking in the second axial position. A stop can be provided for this purpose, for example.

For example, it can be provided that the rotating element can only be set to the second position in predetermined angular sections, i.e. only in predetermined rotational positions of the rotating element. These rotational positions can be defined by providing a projection on the rotating element that engages with notches arranged on the support structure in predetermined rotational positions. Alternatively, notches may be arranged on the rotary member and at least one protrusion may be arranged on the support structure. Additionally or alternatively, other locking devices may be provided.

In particular, the number of predetermined rotational positions may correspond to the number of contact elements. The rotational positions of the rotating element in the second axial position may be arranged in such a way that in some rotational positions, preferably in each of these rotational positions, the contact element is in contact with a contact element, in particular with a respective contact element that is different from the other contact elements.

The rotary element may be movable along the axis of rotation by at least 0.5 mm and at most 3 mm, preferably at least 1 mm and at most 2 mm, particularly preferably by 1.5 mm.

The rotary element can comprise a smooth surface on an outer surface. To improve the feel and/or to better grip the control element, the outer surface can comprise an anti-slip surface and/or coating, for example, in the form of a roughened and/or structured surface and/or notched surface.

To improve operation, the control element can comprise at least one spring, preferably arranged in the axial direction, the spring being arranged between the carrier structure and the rotary element.

The rotary element can be held in the first position by the spring. The rotary element can be brought into the second position by pressing the rotary element in the axial direction, particularly in the direction of the capacitive surface. The spring can be compressed. When the rotary element is released, the spring can expand again and typically moves the rotary element back into the first axial position. In one embodiment, the control element comprises at least three, preferably at least four springs. The springs are typically and/or preferably coil springs, but can also be designed as leaf springs, torsion springs, compression springs, or another type of spring. A combination of different types of springs is also conceivable. The springs are typically arranged such that a vector of the spring force runs parallel to the axis of rotation of the rotary element. The springs are preferably arranged in a rotationally symmetrical manner around the axis of rotation. Additionally or alternatively, the control element can comprise a vertically arranged push-push element.

The carrier structure can be, for example, ring-shaped or hollow-cylindrical. A hollow or ring-shaped design has the advantage of the capacitive surface in the center of the control element being visible to a user. For example, a function or information can be displayed optically in the center.

The control element can comprise one or more optical lenses. The optical lens can be arranged, for example, in the center of the carrier structure. The lens can be arranged concentrically to the carrier structure. The arrangement of a plurality of lenses can have an aesthetic effect, for example, by creating the optical effect of several layers. A zoom effect can further be achieved.

At least one lens may be configured to focus a light beam. Alternatively or additionally at least one lens may be configured to disperse a light beam. At least one lens may be convex, biconvex, planoconvex, positive meniscus, negative meniscus, plano-concave or bi-concave. Several lenses of the same design and/or with different designs from each other can be provided.

The rotary element can comprise an inner ring having an inwardly protruding contact nose. The contact nose preferably projects radially inwards. The inner ring and the contact nose protruding in the direction of the contact element or in the direction of the contact element assembly comprise or consist of an electrically conductive material. When the rotary element does not consist of electrically conductive material, electrically conductive areas of the inner ring can be arranged such that they touch an outer area of the rotary element that can be touched by the user. The contact nose can be used to conductively connect the conductive area of the rotary element to one of the contact elements. The inner ring is preferably designed such that only one area, for example, the contact nose, can make electrical contact with the contact element and that by rotating the rotary element, the inner ring is in electrical contact with different contact elements of the contact element assembly. The inner ring can be fixedly connected to other parts of the rotary element, for example, by gluing, soldering, welding and/or a form fit and/or friction fit.

Preferably, the contact nose can contact the contact elements radially with respect to the axis of rotation of the rotary element. The contact elements may extend along the axis of rotation in such a way that the contact nose can contact the contact elements both in a first axial position of the rotational element and in a second axial position of the rotational element. The contact elements may be formed in such a way that, when moving the rotary element along the axis of rotation from the first to the second position, the contact nose may continuously contact one, preferably the same, contact element. Thus, a user can already make a selection in the first axial position and merely confirm it in the second position.

The carrier structure can be made of a non-capacitive, preferably electrically insulating, material or at least comprise said material. The carrier structure can preferably comprise a plastic, for example, PP, PC, or ABS.

The rotary element can comprise electrically conductive material and/or comprise electrically non-conductive, insulating material. The rotary element can comprise, for example, aluminum, steel, stainless steel, copper, electrically conductive rubber, PP, PC and/or ABS. If the rotary element comprises electrically insulating material on an outer surface accessible to a user, it can be advantageous when a minimal distance between the accessible surface, that is, the surface to be touched by the user for controlling, and the functional, electrically conductive areas, for example, the inner ring and the underside of the rotary element, which touches the capacitive surface in an axial position, is at most 2 mm, preferably at most 1.8 mm, particularly preferably at most 1.5 mm. Said minimum distance can be a minimum of 0.1 mm, preferably a minimum of 0.2 mm, particularly preferably a minimum of 0.3 mm.

The control element can comprise a feedback element for returning haptic feedback to the user when the rotary element is rotated. The feedback element can particularly be designed as a ring. The ring can comprise elastic projections which are pushed back as a function of the rotational position of the rotary element. The ring can comprise notches into which a latching lug of the rotary element engages during rotation and slips with further rotation. The feedback element can be a ratchet. The feedback element can comprise teeth into which elastic projections of the rotary element can engage, or vice versa. The position of the projections, notches and/or teeth can be arranged to correspond to the contact elements. Thus, when rotating the rotary element, the user can receive haptic feedback for haptic recognition of the functional position. In an alternative embodiment, the rotary element can also slide rotationally and be continuously adjustable.

The present application also comprises a system for controlling a function on a capacitive surface. The system comprises a capacitive surface, particularly a touch screen, and a control element according to the above statements. The contact area of the at least one contact element is arranged at least partially touching the capacitive surface. The contact area can be at least partially glued to the capacitive surface, preferably using an electrically conductive adhesive.

The rotary element can assume a first and a second position. In a first position along the axis of rotation, the rotary element can be spaced from the capacitive surface. In a second position along the axis of rotation, the rotary element can be at least partially in contact with the capacitive surface. To be in contact here means that an electrically conductive part of the rotary element, usually the underside, is touching the capacitive surface.

The control element can be designed to give haptic feedback. For example, contact of an electrically conductive area of the rotary element with the capacitive surface, that is, bringing the rotary element into the second position, can be confirmed by the user receiving haptic feedback. This can be, for example, a short vibration of the control element. For example, the system can comprise a vibration actuator for this purpose. The vibration actuator can enable the capacitive surface to vibrate in response to detecting contact or movement of a finger on the touch screen. Alternatively or additionally, provision can be made for a vibration actuator to be arranged on the control element and for the control element to vibrate.

The capacitive surface, for example, in the form of a touch screen, can comprise glass or a transparent plastic. The control element is typically arranged on the upper side of the capacitive surface. The capacitive surface usually comprises electronic components. The electronic components of the capacitive surface, particularly of the touch screen, are typically arranged below the upper side, on the side facing away from the control element.

The system can comprise a plurality of controls.

The control element can be glued to the capacitive surface. Particularly, the carrier structure can at least partially be glued to the capacitive surface.

BRIEF DESCRIPTION OF THE FIGURES

Further features and embodiments of the invention emerge from the following embodiment, which contains non-limiting examples which are explained in more detail with reference to the accompanying drawings.

Shown are.

DETAILED DESCRIPTION

Recurring features are provided with the same reference symbols in the following figures.

Figure 1:
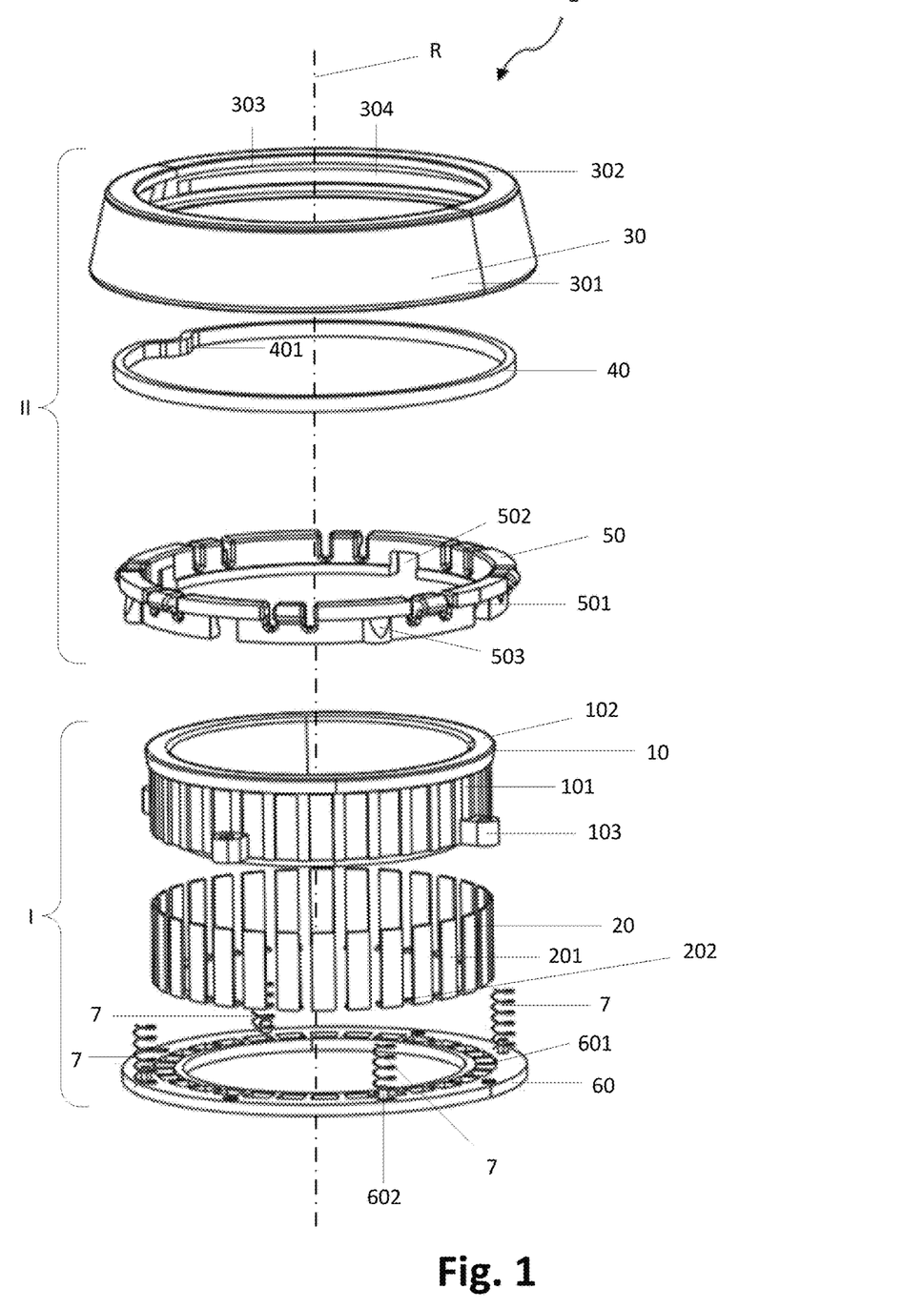
FIG. 1 an exploded view of a control element.

FIG. 1 shows a control element 1 in a three-dimensional exploded view. The control element 1 comprises a carrier structure 10 in the shape of a hollow cylinder. Rectangular recesses 101 are provided on an outside of the carrier structure 10, which recesses are spaced apart from one another and are arranged rotationally symmetrically about an axis of rotation R. The carrier structure 10 comprises a circumferential, radially outwardly projecting projection 102 on the upper side thereof. Furthermore, the carrier structure 10 and the underside thereof comprises four radially outwardly projecting projections 103.

A plurality of contact elements 20, thirty contact elements 20 in the example shown, is arranged rotationally symmetrically about the axis of rotation R. The contact elements 20 have a distance of 12° from one another, wherein the electrically insulating distance between the adjacent sides of two contact elements is approximately 4°. The contact elements 20 are each plate-shaped and correspond in size and shape to the recesses 101 of the carrier structure 10. Each of the contact elements 20 is arranged in a recess 101 of the carrier structure 10 and glued thereto. The contact elements 20 comprise copper. Each of the contact elements 20 comprises a contact area 202 at the lower end thereof, which contact area is angled approximately 90° with respect to an upper area 201 and extends radially in the direction of the axis of rotation R. The contact area 202 is part of an underside of the control element 1.

The control element further comprises a rotary element 30. The rotary element 30 is ring-shaped and comprises an outer gripping surface 301 angled by approximately 45° with respect to the axis of rotation (R). In another embodiment, the outer gripping surface can run parallel to the axis of rotation or have another angle. An inner diameter of the rotary element 30 is larger than an outer diameter of the carrier structure 10. The rotary element comprises an inwardly projecting projection 302 on the upper side thereof. In the assembled state of the control element 1, said projection is arranged opposite the projection 102 and points in the direction of the axis of rotation R. In the assembled state, there is a gap between the projections 102 and 302, so that the rotary element 30 can be rotated relative to the structure 10. The rotary element comprises an inner groove 303 into which an inner ring 40 is inserted. The inner ring 40 is preferably elastically compressible for insertion into the groove 303, similar to a conventional locking ring. The inner ring 40 comprises an inwardly protruding contact nose 401. The inner ring 40 is made of an electrically conductive material, for example, copper. In the assembled state of the control element 1, the contact nose 401 can be brought into contact with the contact elements 20 by rotating the rotary element 30.

The control element 1 further comprises a ring 50. This is connected to the rotary element 30 by means of clips 501. For this purpose, the rotary element 30 comprises a further groove 304 into which the elastic projections of the clips 501 can engage. The ring 50 further comprises recesses 502 into which the projections 103 engage in the assembled state of the control element. The ring is thus rotationally fixed with respect to the carrier structure 10. However, it can be displaced with respect to the carrier structure 10 along the axis of rotation R together with the rotary element 30. The ring 50 in the present example is made of plastic, particularly it comprises PP.

The control element further comprises a fastening ring 60 which is screwed to the carrier structure 10 or is fixed to the carrier structure in some other way. The fastening ring 60 also comprises a plastic, preferably PP. The fastening ring 60 comprises recesses 601 through which the contact elements 20 protrude in the assembled state of the control element 1. For example, the fastening ring can be arranged on a capacitive surface and glued thereto. Nevertheless, contact between the capacitive surface and the contact elements 20 can be ensured.

Four spiral springs 70 are attached at their lower end to a respective pin 602 protruding upward from the fastening ring 60 parallel to the axis of rotation. The ring 50 comprises four spring receptacles 503 into which the springs 70 protrude at their upper end and are fastened there. The rotary element 30, connected to the inner ring 40 and the fastening ring 50, can be moved downward by compressing the springs 70. If the control element 1, as shown in FIGS. 2 and 3, is arranged on a capacitive surface 8, the rotary element 30 can be moved from a first position (in which the springs 70 are essentially relaxed or at least more relaxed than in the second position) into a second position in which the springs 70 are compressed and an underside 305 of the rotary element comes into contact with the capacitive surface 8, particularly resting against it.

Figure 2:
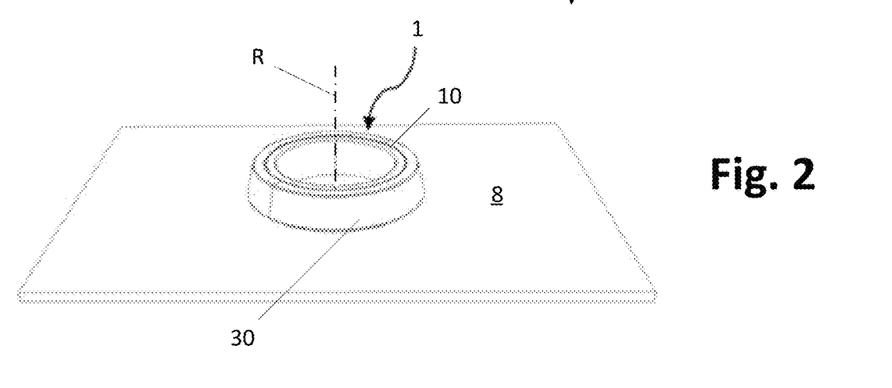
FIG. 2 a three-dimensional view of a system comprising the control element of FIG. 1 and a capacitive surface, FIG. 3 a detail of a cross section through the system according to FIG. 2, FIG. 4 a control element according to FIG. 1 in the assembled state in a three-dimensional view obliquely from below.

FIG. 2 shows a three-dimensional view of a system comprising the control element 1 from FIG. 1 and a capacitive surface 8. The control element 1 is assembled. The fastening ring is fastened to the capacitive surface 8 using an adhesive. The contact area of the contact elements 20 rests against the capacitive surface 8. The capacitive surface 8 is a touch screen having an upper side made of glass.

Figure 3:
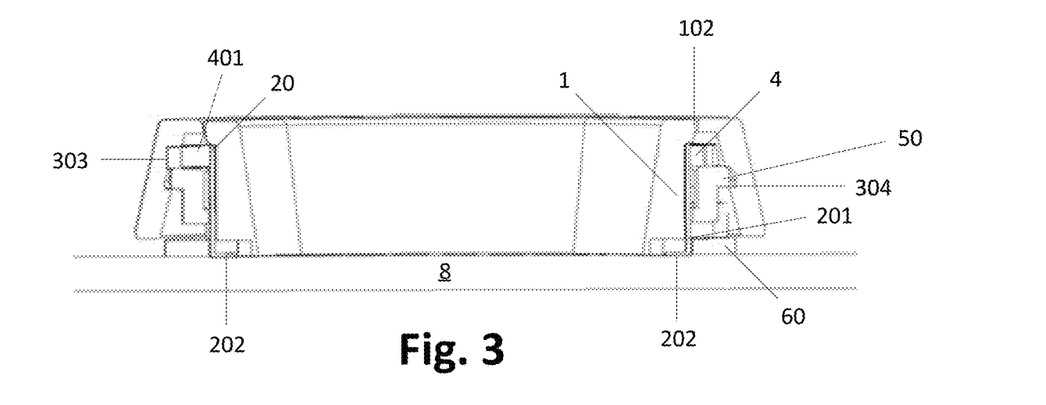
Figure 5A:
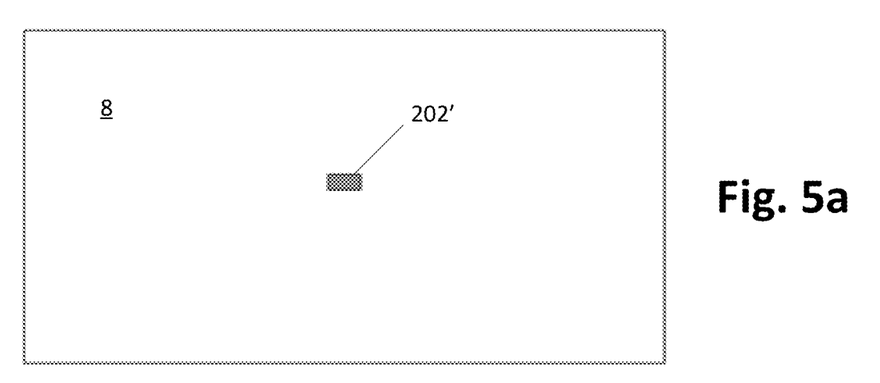
FIG. 5a shows a schematic representation of the capacitive surface according to FIG. 4 with the areas addressed capacitively in the first position.
Figure 5B:
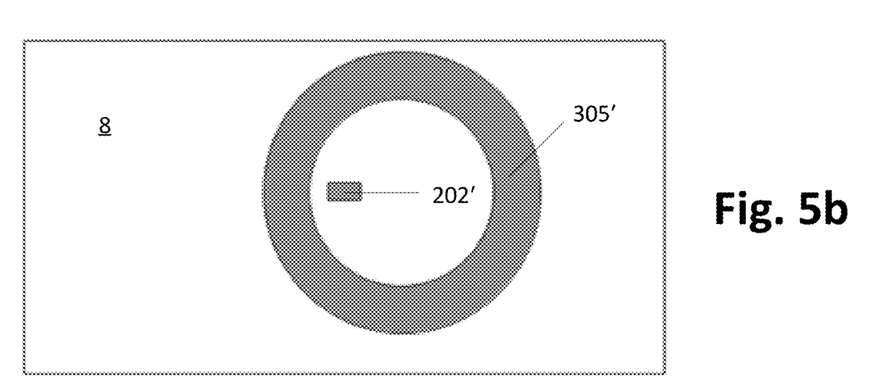
FIG. 5b shows a schematic representation of the capacitive surface according to FIG. 4 with the areas addressed capacitively in the second position.

FIG. 3 shows a detail of a cross section through the system according to FIG. 2. The rotary element is located in the first position spaced apart from the capacitive surface 8. The contact nose 401 of the inner ring touches a contact element 20, so that the capacitive surface perceives electrical signals via contact area 202, as depicted in FIG. 5a. The capacitively addressed area 202' of the capacitive surface is depicted in FIG. 5a. If the rotary element is located in the second position, electrical signals are additionally transmitted via the underside 305 of the rotary element 30 to the capacitive surface 8, so that said signals are transmitted not only in the area 202' but also in the area 305', see FIG. 5b.

Figure 4:
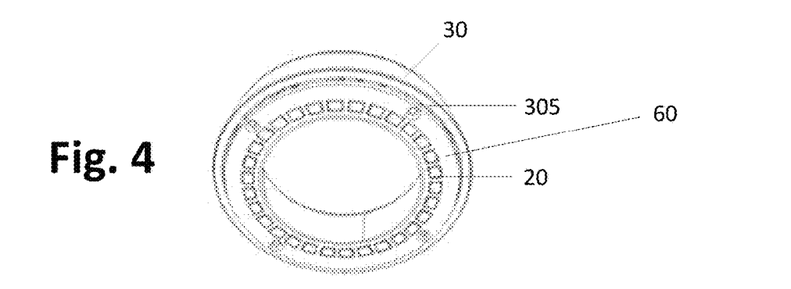

FIG. 4 shows the control element according to FIG. 1 in the assembled state in a three-dimensional view obliquely from below.

The assembly of the control element 1 typically takes place in accordance with the following steps. The contact elements 20 are glued or back-molded onto the carrier structure 10. The inner ring 40 is clamped into the rotary element 30. The rotary element 30 with the inner ring 40 inserted is pushed onto the ring 50 until the clips 501 engage in the groove 304. The assembly II, comprising the rotary element 30, the inner ring 40 and the ring 50, is pushed into the assembly I, comprising the carrier structure 10 and the contact elements 20. The fastening ring 60 is screwed to the carrier structure 103.

When the control element is assembled, the control element is fastened, as above, by gluing and/or screws on the upper side, particularly on an upper glass of a capacitive touch display.

The contact elements 20 are in direct contact with the touch screen glass without an adhesive element lying between them. The rotary element 30 having the inner ring 40 fixed therein can be rotated relative to the ring 50. The rotary element 30, the inner ring 40 and the ring 50 can be displaced by up to 2 mm along the axis of rotation. The spring 70 enables the assembly II to return to the first position (the standard position) after the assembly II has been brought to the second position.

As a touch display, the capacitive surface 8 can comprise a touch foil and a display glass covering it.

By placing a finger on the rotary element 30, the finger capacitance is transferred to the inner ring 40, which is in contact with one of the contact elements 20. The contact element 20 transfers the capacitance to the display glass and a capacitive foil of the touch display. The contact and the position of the contact nose 401 of the inner ring are detected.

By rotating the rotary element 30, the part 40 also rotates and makes contact with a new contact element 20, for example, every 12°.

The inner ring 40 can be designed such that, when it is placed between two contact elements 20, it comes into contact with both of them. This can ensure a smooth transition of the rotation detection.

By pressing on the rotary element 30, the assembly II slides in the z-direction and the rotary element 30 comes into contact with the display glass 8. The touch foil arranged under the display glass then recognizes a circle and a point or area in the shape of the contact area 202. This can then be interpreted as a validation click of the capacitive system.

The control element 1 has a click function that the user can hear and feel in order to give the user physical feedback and to increase the precision in the turning function. For this purpose, the rotary element 30 comprises an inner toothed ring 306, the teeth of which are rotated when the rotary ring is rotated via a flexible projection arranged on the ring 50, so that haptic feedback is produced. The toothed ring 306 can also be designed as a wave pattern. The flexible projection can be made of plastic and/or metal. The flexible protrusion presses on the toothed ring 306 of the rotary element 30 along a wave-shaped or tooth-shaped pattern. In the example shown, the projection is part of the ring 50 and the wave pattern is part of the rotary element 30. In another embodiment, the arrangement can also be provided the other way round. The click function can take place horizontally, as shown in the example, or vertically. The wave pattern or the toothed ring 306 is designed so that a click occurs every 5 degrees of rotation.

The rotary element 30 may comprise or consist of a non-electrical material. When the touchable outer surface 301 consists of a non-electrical material, a material thickness in the area of the inner ring 40 is preferably at most 1.5 mm. Capacitance of the module can thus be guaranteed. If the rotary element is made of or comprises electrically conductive material, this area can have a greater material thickness.

The springs 70 can comprise plastic and/or metal.

What is claimed is:

1. A control element, which is arrangeable on a capacitive surface, for controlling a function of the capacitive surface, comprising:
a carrier structure;
a rotary element which is rotatable about an axis of rotation with respect to the carrier structure and comprising at least one electrically conductive area; and
a plurality of electrically conductive contact elements disposed around the axis of rotation;
wherein the contact elements include:
a contact area located at least partially on an underside of the control element so that when the control element is arranged on the capacitive surface, the contact area is arranged at least partially touching the capacitive surface, and
an upper area that is angled approximately 90° with respect to the contact area;
wherein the electrically conductive area of the rotary element is in contact with a contact element of the plurality of contact elements in at least one rotational position of the rotary element, and wherein the rotary element is movable along the axis of rotation with respect to the carrier structure, and wherein a rotation of the rotary element is enabled in a first axial position of the rotary element and is blocked in a second axial position of the rotary element.

2. The control element according to claim 1, wherein the rotating element is configurable so as to only be set to the second position in one or more predetermined angular sections.

3. The control element according to claim 1, wherein in the second axial position the rotary element is blocked via a positive locking.

4. The control element according to claim 1, wherein at least one spring is arranged between the carrier structure and the rotary element, wherein the spring element is arranged in an axial direction.

5. The control element according to claim 1, wherein a plurality of contact elements is arranged at a distance from one another and in a rotationally symmetrical manner about the axis of rotation.

6. The control element according to claim 1, wherein at least one of the carrier structure or the rotary element is formed in a circular shape.

7. The control element according to claim 6, wherein at least one of the carrier structure or the rotary element is hollow or includes at least one lens.

8. The control element according to claim 7, wherein at least one lens of the at least one lens is arranged concentrically to the carrier structure.

9. The control element according to claim 7, wherein at least one lens of the at least one lens is convex, biconvex, plano-convex, positive meniscus, negative meniscus, plano-concave or biconcave.

10. The control element according to claim 1, wherein the rotary element is movable along the axis of rotation by at least 0.5 mm and at most 3 mm.

11. The control element according to claim 10, wherein the rotary element is movable along the axis of rotation by at least 1 mm and at most 2 mm.

12. The control element according to claim 10, wherein the rotary element is movable along the axis of rotation by 1.5 mm.

13. The control element according to claim 1, wherein the rotary element comprises an electrically conductive inner ring having a contact nose protruding in a direction toward the contact element.

14. The control element according to claim 1, wherein a feedback element provides haptic feedback when rotating the rotary element, wherein the feedback element comprises a ring that includes one or more elastic projections, wherein the one or more elastic projections are pushed back as a function of the rotational position of the rotary element.

15. A system for controlling a function on a capacitive surface, comprising:
a capacitive surface; and
a control element comprising:
a carrier structure;
a rotary element which is rotatable about an axis of rotation with respect to the carrier structure and comprising at least one electrically conductive area; and
a plurality of electrically conductive contact elements disposed around the axis of rotation,
wherein the contact elements include:
a contact area that is arranged at least partially on an underside of the control element so that when the control element is arranged on the capacitive surface, wherein the contact area is arranged at least partially touching the capacitive surface,
an upper area that is angled approximately 90° with respect to the contact area;
wherein the electrically conductive area of the rotary element is in contact with a contact element of the plurality of contact elements in at least one rotational position of the rotary element, wherein the rotary element is movable along the axis of rotation with respect to the carrier structure, wherein the contact area of the contact element is located at least partially touching the capacitive surface, wherein in a first position along the axis of rotation, the rotary element is spaced from the capacitive surface, and wherein in a second position along the axis of rotation, the rotary element is at least partially in contact with the capacitive surface, and wherein a rotation of the rotary element is enabled in a first axial position of the rotary element and is blocked in a second axial position of the rotary element.

16. The system of claim 15, wherein the capacitive surface is a touch screen.

17. The system of claim 15, wherein in the second axial position the rotary element is blocked via a positive locking.

18. The system of claim 15, wherein at least one of the carrier structure of the rotary element is formed in a circular shape, and wherein at least one of the carrier structure or the rotary element is hollow or includes at least one lens.

* * * * *